March 10, 1925.

A. E. L. CHORLTON

INTERNAL COMBUSTION ENGINE

Filed Sept. 14, 1923

1,529,574

2 Sheets-Sheet 1

Inventor
A. E. L. Chorlton,

By
Watson, Cit, Morse & Grindle
Att'ys.

Patented Mar. 10, 1925.

1,529,574

UNITED STATES PATENT OFFICE.

ALAN ERNEST LEOFRIC CHORLTON, OF LONDON, ENGLAND, ASSIGNOR OF ONE-HALF TO WILLIAM BEARDMORE, LORD INVERNAIRN, OF LONDON, ENGLAND.

INTERNAL-COMBUSTION ENGINE.

Application filed September 14, 1923. Serial No. 662,777.

*To all whom it may concern:*

Be it known that I, ALAN ERNEST LEOFRIC CHORLTON, subject of the King of England, and residing at London, in England, have invented certain new and useful Improvements in Internal-Combustion Engines, of which the following is a specification.

This invention relates to internal combustion engines and has more particular reference to the construction and arrangement of a bearing member between the piston and the connecting rod. Although not restricted thereto, the invention is primarily applicable to two-stroke internal combustion engines employing high compression and it has for its object to provide a bearing member which will be able to withstand heavy thrusts without undue wear or excessive heating.

In the internal combustion engine according to the present invention the bearing member is so constructed and arranged that the whole of its lower surface is available as a bearing surface, such surface being made as large as the construction of piston and necessary clearances will permit. The upper portion of the bearing member is preferably cut away to enable it to be firmly secured by means of bolts or the like to an inward projection on the piston.

According to a further feature of the invention, means are provided whereby the bearing member between the piston and the connecting rod is insulated from the heat of the piston. Such insulating means preferably consists of a block of heat insulating material inserted between the inward projections on the piston and the cut-away portions of the bearing member. Alternatively the piston may be formed in two parts, to the lower of which the bearing member is secured, heat insulating blocks being inserted between the two parts of the piston.

The invention may be carried out in various ways and two convenient arrangements are illustrated by way of example in the accompanying drawings, in which—

Figure 1:
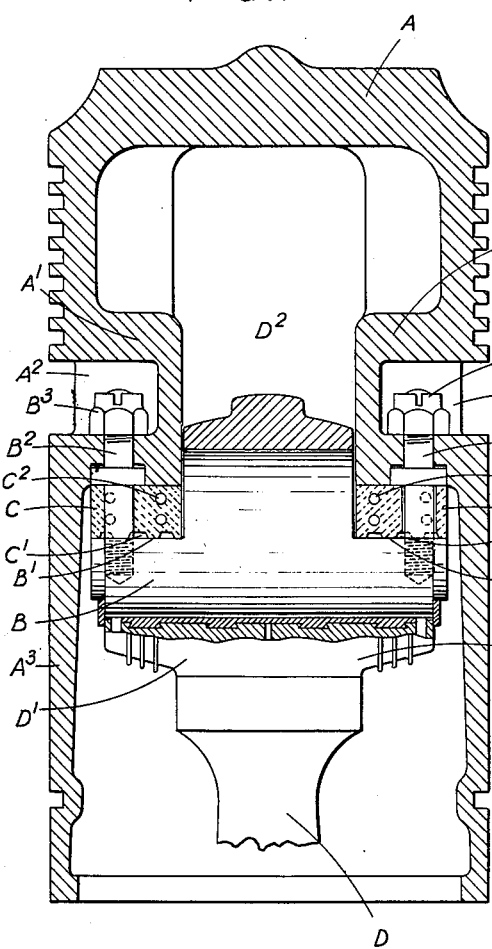
Figure 2:
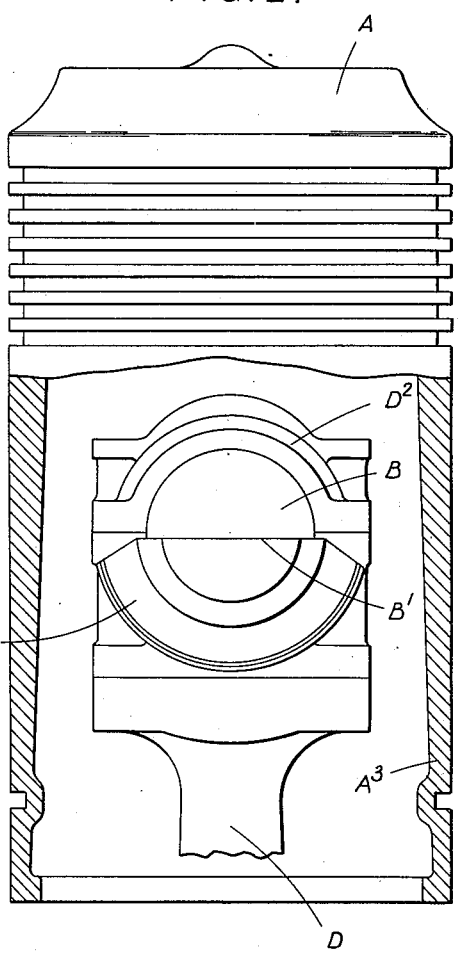
Figure 3:
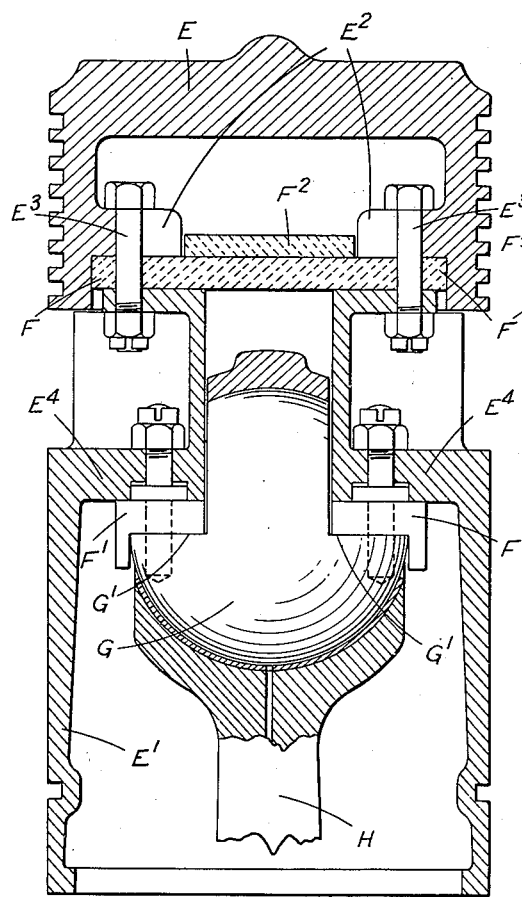
Figure 4:
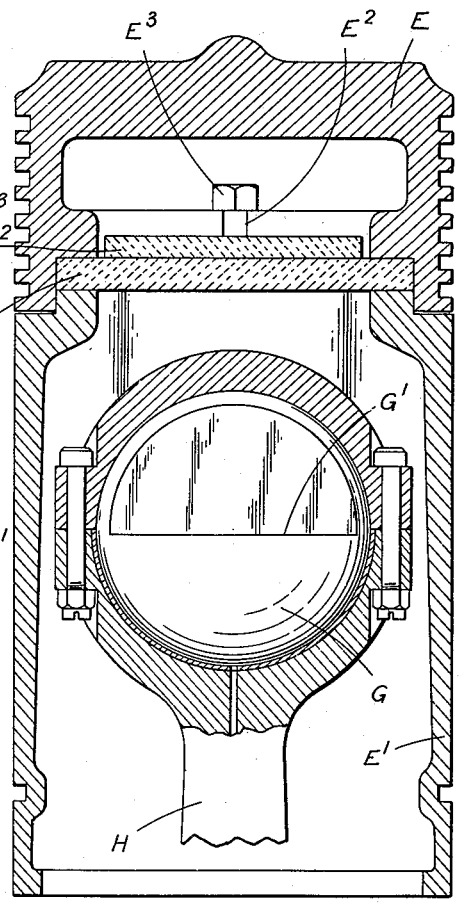

Figures 1 and 2 are central sections at right angles to one another of one construction, the bearing member being shown in elevation in Figure 2, and Figures 3 and 4 show similar views of another construction.

In the construction shown in Figures 1 and 2, the piston A is formed in one piece and has two diametrically opposite inward projections A', these projections being formed in such a manner as to leave external recesses $A^2$ in the piston wall. The bearing member B is in the form of a gudgeon pin of substantially cylindrical shape and has a length sufficient to extend right across the available space within the piston skirt $A^3$. If desired, the piston skirt may be cut away near the ends of the gudgeon pin B, so as to allow of the pin having still greater length. The upper portion of the pin B is cut away at both ends to form flat surfaces B' where it can be secured to the piston A. The gudgeon pin is disposed within the piston in such a manner that its two flat surfaces B' lie below the two internal projections A' on the piston A, and is secured to these projections by means of studs $B^2$, which extend through to the external recesses $A^2$ in the piston wall and are held in position by means of nuts $B^3$ disposed in the recesses $A^2$.

Between the lower surfaces of the projections A' and the flat surfaces B' are disposed blocks C preferably of heat insulating material, these blocks having grooves C' cut in their lower surfaces (i. e. the surfaces in contact with the gudgeon pin) to form air gaps, thus further obstructing the passage of heat from the piston to the gudgeon pin. Further air gaps may also be provided by drilling the blocks C with transverse holes $C^2$.

The connecting rod D is formed at its upper end to engage with the gudgeon pin B, and is shaped to correspond to the cylindrical portion of the pin. This shaped part D' will for convenience be termed a "strap". The strap D' thus extends for the whole length of the lower surface of the pin and has a narrow upper portion $D^2$ engaging with the short cylindrical upper surface of the gudgeon pin B between the two cut-away portions.

It will be understood that the upper surface of the gudgeon pin may be cut away in the centre instead of at its two ends, so as to be secured to a central projection in the piston, the strap being correspondingly shaped.

In the construction shown in Figures 3 and 4 the piston is divided into two parts E and E', the head or upper part E being slotted as at $E^2$ to allow of the insertion of the bolts $E^3$ by which the two parts of the piston are secured together. A heat-insulating block F is inserted between the two parts E and E' of the piston and is held in position by means of the same bolts E³ which serve to secure the parts of the piston together. This heat-insulating block F between the two parts of the piston may be provided instead of or in addition to a heat-insulating block F' between the lower or skirt portion E' of the piston and the gudgeon pin which is mounted therein and may be formed similar to that shown in Figures 1 and 2.

In the construction actually shown in Figures 3 and 4 the bearing member G is not in the form of a cylindrical gudgeon pin but is mainly spherical in shape. The sphere has its upper surface cut away at one or more points (in the case illustrated at two opposite points) to form flat surfaces G' by which it is secured to inwardly projecting portions E⁴ of the skirt portion E' of the piston in a manner similar to that of the construction shown in Figures 1 and 2. The connecting rod H is shaped at its upper end to engage with the spherical portion of the bearing member G.

Other forms of bearing member may also be employed, if desired. Thus, for example, the bearing member may be so formed as to have a concave lower bearing surface (either spherical or cylindrical), with which engages a correspondingly shaped convex member mounted on or formed by the upper end of the connecting rod, suitable guides being provided.

Direct radiation of heat from the piston head to the bearing member may be prevented by providing a pad of heat-insulating material across the interior of the piston above the bearing member. Such a pad is shown by way of example for the two-part piston construction at F² in Figures 3 and 4 but may also be provided in a piston made in a single piece.

It will be understood that the constructions illustrated and described have been given by way of example only and that the arrangements may be varied without departing from the scope of the invention.

What I claim as my invention and desire to secure by Letters Patent is:—

1. In an internal combustion engine the combination of a piston having an inward projection, a connecting rod, and a bearing member between the piston and the connecting rod so constructed and arranged that the whole of its lower surface is available as a bearing surface, such surface being made as large as the construction of piston and necessary clearances will permit whilst the upper portion of the bearing member is cut away adjacent to the inward projection on the piston to enable it to be firmly secured thereto, and means for securing the bearing member to the inward projection on the piston including longitudinally disposed fastening means passing through one wall of each projection.

2. In an internal combustion engine the combination of a piston, a connecting rod, a bearing member between the piston and the connecting rod, and means whereby the bearing member is insulated from the heat of the piston as set forth.

3. In an internal combustion engine the combination of a piston, a connecting rod, a bearing member between the piston and the connecting rod so constructed and arranged that the whole of its lower surface is available as a bearing surface, such surface being made as large as the construction of piston and necessary clearances will permit and means whereby the bearing member is insulated from the heat of the piston as set forth.

4. In an internal combustion engine the combination of a piston having two opposite inwardly projecting portions, a connecting rod, a mainly cylindrical bearing member between the piston and the connecting rod having its upper portion cut away at each end adjacent to the inward projections on the piston to enable it to be firmly secured thereto, means for securing the bearing member to the inward projections on the piston, and heat insulating material inserted between the projections on the piston and the cut away portions of the bearing member as set forth.

5. In an internal combustion engine the combination of a piston having an inward projection, a connecting rod, and a bearing member between the piston and the connecting rod so constructed and arranged that the whole of its lower surface is available as a bearing surface, such surface being made as large as the construction of piston and necessary clearances will permit whilst the upper portion of the bearing member is cut away adjacent to the inward projection on the piston to enable it to be firmly secured thereto, means for securing the bearing member to the inward projection on the piston, and heat insulating material inserted between the projection on the piston and the cut away portion of the bearing member as set forth.

6. In an internal combustion engine the combination of a piston having two opposite inwardly projecting portions, a connecting rod, a mainly cylindrical bearing member between the piston and the connecting rod having its upper portion cut away at each end adjacent to the inward projections on the piston to enable it to be firmly secured thereto, means for securing the bearing member to the inward projections on the piston, and means whereby the bearing member is insulated from the heat of the piston, the bearing member being so constructed and arranged that the whole of its lower surface is available as a bearing surface, such surface being made as large as the construction of piston and necessary clearances will permit as set forth.

7. In an internal combustion engine the combination of a piston formed in two parts, a connecting rod, a bearing member between the piston and the connecting rod so constructed and arranged as to have the whole of its lower surface available as a bearing surface, means for securing the bearing member to the lower part of the piston, and heat insulating material inserted between the two parts of the piston as set forth.

8. In an internal combustion engine the combination of a piston formed in two parts the lower part having two opposite inwardly projecting portions, a connecting rod, a mainly cylindrical bearing member between the piston and the connecting rod having its upper portion cut away at each end adjacent to the inward projections on the piston to enable it to be firmly secured thereto, means for securing the bearing member to the inward projections on the piston, and heat insulating material inserted between the two parts of the piston, the bearing member being so constructed and arranged that the whole of its lower surface is available as a bearing surface, such surface being made as large as the construction of piston and necessary clearances will permit as set forth.

9. In an internal combustion engine the combination of a piston formed in two parts, a connecting rod, a bearing member between the piston and the connecting rod, means for securing the bearing member to the lower part of the piston, heat insulating material inserted between the two parts of the piston, and heat insulating material inserted between the lower part of the piston and the bearing member as set forth.

10. In an internal combustion engine the combination of a piston formed in two parts the lower part having an inward projection, a connecting rod, and a bearing member between the piston and the connecting rod so constructed and arranged that the whole of its lower surface is available as a bearing surface, such surface being made as large as the construction of piston and necessary clearances will permit whilst the upper portion of the bearing member is cut away adjacent to the inward projection on the piston to enable it to be firmly secured thereto, means for securing the bearing member to the inward projection on the piston, heat insulating material inserted between the two parts of the piston, and heat insulating material inserted between the projection on the piston and the cut-away portion of the bearing member as set forth.

In testimony whereof I have signed my name to this specification.

ALAN ERNEST LEOFRIC CHORLTON.